(12) United States Patent
Weaver

(10) Patent No.: US 7,160,503 B2
(45) Date of Patent: Jan. 9, 2007

(54) METAL MATRIX COMPOSITES OF ALUMINUM, MAGNESIUM AND TITANIUM USING SILICON HEXABORIDE, CALCIUM HEXABORIDE, SILICON TETRABORIDE, AND CALCIUM TETRABORIDE

(75) Inventor: Samuel C. Weaver, Knoxville, TN (US)

(73) Assignee: Saffil Limited, Widness (GB)

( * ) Notice: Subject to any disclaimer, the term of this patent is extended or adjusted under 35 U.S.C. 154(b) by 216 days.

(21) Appl. No.: 10/141,320

(22) Filed: May 8, 2002

(65) Prior Publication Data

US 2003/0059641 A1 Mar. 27, 2003

Related U.S. Application Data

(63) Continuation-in-part of application No. 09/961,523, filed on Sep. 24, 2001, now abandoned.

(51) Int. Cl.
C22C 23/00 (2006.01)
C22C 21/00 (2006.01)
C22C 14/00 (2006.01)

(52) U.S. Cl. ............... 420/402; 420/417; 420/528; 148/437; 148/420; 148/421

(58) Field of Classification Search ............ 148/437, 148/420, 421; 428/614, 539.5; 420/528, 420/417, 402
See application file for complete search history.

(56) References Cited

U.S. PATENT DOCUMENTS

| 1,913,373 | A | | 6/1933 | Golyer |
| 4,091,871 | A | | 5/1978 | Chiaramonte et al. |
| 4,215,750 | A | | 8/1980 | Fields et al. |
| 4,513,824 | A | | 4/1985 | Ford |
| 4,576,789 | A | * | 3/1986 | Prasad ............. 420/464 |
| 4,605,440 | A | | 8/1986 | Halverson et al. |
| 4,608,227 | A | | 8/1986 | Preiss |
| 4,655,293 | A | | 4/1987 | Criner et al. |
| 4,737,416 | A | * | 4/1988 | Akoh et al. ........... 428/469 |
| 4,793,967 | A | | 12/1988 | Pryor et al. |
| 4,808,463 | A | | 2/1989 | Yoshikatsu et al. |
| 5,149,496 | A | | 9/1992 | Das et al. |
| 5,344,608 | A | | 9/1994 | Eom et al. |
| 5,462,437 | A | * | 10/1995 | Prasad et al. ........... 433/207 |
| 5,480,695 | A | | 1/1996 | Tenhover et al. |

(Continued)

FOREIGN PATENT DOCUMENTS

EP 0 635 579 B1 1/1997

(Continued)

OTHER PUBLICATIONS

"Metals Handbook: Desk Edition: 2nd Ed", ASM International, 1998, p. 39, 674-680.*

(Continued)

Primary Examiner—Roy King
Assistant Examiner—Janelle Morillo
(74) Attorney, Agent, or Firm—Frederick L. Tolhurst; Cohen & Grigsby, P.C.

(57) ABSTRACT

A metal matrix composite was fabricated by adding particles of calcium hexaboride to a metal of aluminum, magnesium or titanium and their alloys. The resulting metal matrix composite is light weight has improved strength, increased elastic modulus and reduced thermal coefficient of expansion, thus making the metal matrix composite more useful in industry. A metal matrix composite is also formed by mixing particles of aluminum, magnesium, titanium or combinations thereof with particles of silicon lexaboride, calcium hexaboride, silicon tetraboride, calcium tetraboride or combinations thereof. The blended particles are processed according to powder metallurgical techniques to produce a metal matrix composite material.

13 Claims, 1 Drawing Sheet

U.S. PATENT DOCUMENTS

| | | | |
|---|---|---|---|
| 5,486,223 A | 1/1996 | Carden | |
| 5,564,492 A | 10/1996 | Preiss | |
| 5,573,607 A * | 11/1996 | Weaver | 148/437 |
| 5,573,985 A * | 11/1996 | Weaver | 501/96.1 |
| 5,587,241 A | 12/1996 | Vaughan et al. | |
| 6,042,779 A * | 3/2000 | Oschmann et al. | 419/28 |
| 6,200,526 B1 | 3/2001 | Fox et al. | |
| 6,458,466 B1 * | 10/2002 | Jones et al. | 428/469 |
| 2001/0010870 A1 | 8/2001 | Song et al. | |
| 2002/0153144 A1 * | 10/2002 | Weaver | 168/4 |

FOREIGN PATENT DOCUMENTS

| | | |
|---|---|---|
| JP | 407076749 | 3/1995 |
| JP | 07076749 | 11/1996 |
| WO | WO 96/18748 | 6/1996 |

OTHER PUBLICATIONS

"Aluminum and Aluminum Alloys", ASM International, 1993, p. 169.*

Antony, K.C. et al.: "Metallurgical Stability of Several Boride Dispersion Systems".

Capudean, Bob, "The Structure of Metal", the fabricator.com (Apr. 24, 2003).

Clyne, T.W. and Withers, P.J., "An Introduction to Metal Matrix Composites", Cambridge University Press, pp. 1-70.

Gale, William F., An Introduction to Metallic Materials (Aug. 2, 2000).

* cited by examiner

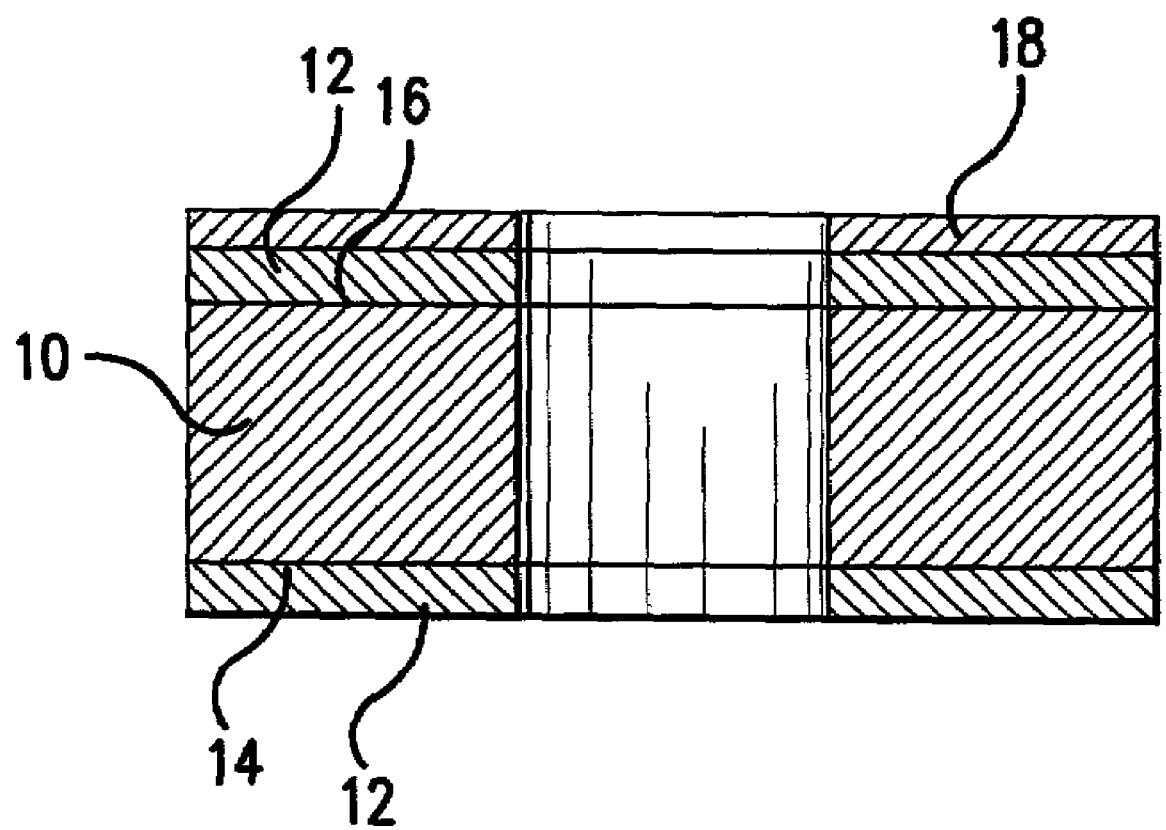

METAL MATRIX COMPOSITES OF ALUMINUM, MAGNESIUM AND TITANIUM USING SILICON HEXABORIDE, CALCIUM HEXABORIDE, SILICON TETRABORIDE, AND CALCIUM TETRABORIDE

CROSS-REFERENCE

This application is a continuation-in-part (CIP) of U.S. patent application Ser. No. 09/961,523 filed Sep. 24, 2001 now abandoned and is currently pending.

FIELD OF THE INVENTION

The present invention relates generally to the improved mechanical and physical properties including strength, elastic modulus and reduced thermal expansion of metal bodies by using metal matrix composites, and more particularly to the reinforcement of aluminum, magnesium and titanium by forming metal matrix composites of those metals using silicon hexaboride, calcium hexaboride, silicon tetraboride or calcium tetraboride particles.

BACKGROUND OF THE INVENTION

The light weight metals of aluminum and magnesium have very large markets for they are utilized in a wide variety of industries. In a lesser way, titanium is also utilized as a light weight fabrication material. These metals suffer from some drawbacks, however, which limit their usefulness. These include low stiffness (low modulus of elasticity), high thermal coefficient of expansion, and low strength. Some of these drawbacks have been overcome through the use of metal matrix composites of these metals. Typically, metal matrix composites are composed by adding ceramics to the metals. The primary objectives of these ceramic additives have been to increase the modulus of elasticity and to reduce the thermal coefficient of expansion. When fibrous material, such as silicon carbide whiskers, are added, strengthening has been observed. Other added materials include the fibers of boron metal, carbon, aluminum silicate, and aluminum oxide, Still other typical strengthening agents are aluminum oxide particulates, boron carbide and silicon carbide in various forms.

Of these, only aluminum oxide particulate and silicon carbide particulate have been extensively utilized in the aluminum-based matrix. To add either of these to molten aluminum, a continuous stirring action must be utilized because the specific gravity of the additives are significantly greater than the molten aluminum. This means that constant agitation of the aluminum/additive mixture is required to keep the additive in substantially uniform distribution throughout the molten aluminum. Similar problems are encountered for mixtures of the same additive with molten magnesium. Stirring the molten metal can keep the additive distributed throughout the molten metal, but such continuous stirring causes oxide inclusions and hydrogen to contaminate the melts.

Furthermore, because of the contamination and the non-uniform nature of the metal matrix composites, remelting (for recycle, etc.) is a problem due to the variability of the resulting feed product.

In the prior art, various methods and compositions have been developed to overcome these difficulties. In some instances, powdered metal processes have been used to make metal matrix composite materials. For example, U.S. Pat. No. 5,573,607 describes a metal matrix composite wherein particles of silicon boride are combined with aluminum, magnesium or titanium to form a metal matrix composite. According to the process therein described, the silicon boride particles can be either pre-blended with the metal particles or stirred into the melt to form the metal matrix. Other examples of the use of powder metallurgy for the manufacture of metal matrix composite materials are shown and described in U.S. Pat. No. 5,712,014 which describes the use of boron carbide in the preparation of the metal matrix composite; and in U.S. Pat. No. 5,948,495 which describes the use of powder metallurgical techniques to make an aluminum/ceramic disk substrate.

OBJECTS OF THE INVENTION

Accordingly, it is an object of the present invention to provide a metal matrix composite using molten metal of aluminum, magnesium and titanium wherein a minimum of stirring is required to maintain particles of the additive agent in suspension.

It is another object of the present invention to provide a metal matrix composite wherein the strengthening agent has a specific gravity similar to that of the molten metal whereby there is little settling of the additive particles during the formation of the metal matrix composite.

It is a further object of the present invention to provide a metal matrix composite wherein the additive particles increases the ductility of the metal matrix composite.

It is a further object of the disclosed invention to provide a metal matrix composite material from a substantially uniform mixture of metal particles and ceramic material particles. It is a further object of the disclosed invention to provide a metal matrix composite material of given properties by combining solid metal particles with solid ceramic particles with the proportion of the metal particles being selected relative to the proportion of ceramic particles.

It is a further object of the disclosed invention to provide a disk of metal matrix composite wherein the composite is made by combining solid metal particles with solid ceramic particles.

Further and other objects of the present invention will become apparent from the description contained herein.

SUMMARY OF THE INVENTION

In accordance with one aspect of the present invention, a new and improved metal matrix composite comprises a metal matrix composite formed from a molten metal selected from the group consisting of aluminum, magnesium, titanium and mixtures thereof, and particles of calcium hexaboride. The amount of calcium hexaboride particles present in the metal is in the range of about 0.1 to about 80 wt. %.

In accordance with another aspect of the present invention, a new and improved metal matrix composite comprises a metal matrix composite formed from a molten metal selected from the group consisting of aluminum, magnesium, titanium and mixtures thereof, and particles of calcium hexaboride and particles of silicon hexaboride. The amount of particles of calcium hexaboride and particles of silicon hexaboride in the metal is in the range of about 0.1 to about 80 wt. %.

In accordance with another aspect of the present invention, a new and improved article of manufacture comprises a metal matrix composite. The metal matrix composite comprises a metal selected from the group consisting of aluminum, magnesium, titanium and mixtures thereof, and particles of calcium hexaboride. The amount of particles of calcium hexaboride in the metal is in a range of about 0.1 to about 80 wt. %.

In accordance with the disclosed invention, the metal particles are selected from the group of aluminum, magnesium, titanium and combinations thereof and the ceramic particles are selected from the group of silicon hexaboride, calcium hexaboride, silicon tetraboride, calcium tetraboride, and combinations thereof.

Preferably, the metal is in the range of 50% to 99% by weight of the composite material and the ceramic is in the range of 1% to 50% by weight of the composite material. More preferably, the metal matrix composite can be tailored to have a modulus of elasticity in the range of 70 to 180 Giga Pascals ("GPa") and can be tailored to have a coefficient of thermal expansion in the range of 8.9 to 21.5 ppm/° K.

BRIEF DESCRIPTION OF THE DRAWING

A presently preferred embodiment of the invention disclosed herein is shown and described in connection with the accompanying drawing wherein the FIGURE is an elevation cross-section of a composite disk and composite disk substrate in accordance with the presently disclosed invention.

DETAILED DESCRIPTION OF THE PREFERRED EMBODIMENTS

A metal matrix composite was fabricated by adding particles of calcium hexaboride to molten aluminum. The calcium hexaboride was supplied by WACKER-CHEMIE of Kempten Germany. Since the specific gravity of the calcium hexaboride is very close to that of aluminum, only a minimal amount of stirring was required to achieve a homogeneous mixture. If heating is accomplished in an induction furnace, a stirring action is automatically achieved. Some mechanical stirring is required under other conditions of heating.

While a range of compositions of from about 0.1 wt. % to about 80 wt. % of calcium hexaboride can be utilized relative to the aluminum, a range of about 5 to about 40 wt. % is most practical for most applications and was utilized for testing. The calcium hexaboride typically has an average particle size range of about 0.1 to about 200 microns. The resultant metal matrix is light weight has improved strength, increased ductility and reduced thermal coefficient of expansion.

The addition of the calcium hexaboride to the molten metal was principally utilized in the development of the present invention. However, it will be understood that the invention also includes the blending of the calcium hexaboride particles with powdered aluminum metal and any other alloying constituents prior to melting the mixture.

In addition a mixture of calcium hexaboride particles and silicon hexaboride particles may be added to the molten metal. A silicon hexaboride prepared by a substantially commercial process can be used and was comparable with that supplied by CERAC of Chicago, Ill. and typically has an average particle size range of about 0.1 to about 200 microns.

The molten mixture can be cast into a desired shape as a manufactured product, such as horseshoes, memory disk substrates, actuator arms for disk drives or any product which would benefit from the improved mechanical and physical properties of the metal matrix composite of this invention.

EXAMPLE 1

A metal matrix composite horseshoe was made from an aluminum matrix composite. The aluminum matrix composite contained from about 5 to about 10 wt % calcium hexaboride particles having an average particle size of about 75 microns and the remainder being A356 aluminum metal. The resulting horseshoe was light, strong, abrasion resistant and unexpectedly ductile. The horseshoe could be bent at an angle of 45 degrees without damage.

EXAMPLE 2

A metal matrix composite memory disk substrate was made from an aluminum matrix composite. The aluminum matrix composite contained from about 40 wt % calcium hexaboride particles having an average particle size of about 10 mircrons and the remainder being aluminum metal.

EXAMPLE 3

A metal matrix composite actuator arm for a hard drive was made from an aluminum matrix composite. The aluminum matrix composite contained about 30 wt % calcium hexaboride particles having an average particle size of about 50 microns and the remainder being A356 aluminum metal.

Magnesium and titanium have low specific gravities similar to that of aluminum. Accordingly, metal matrix composites of these metals with calcium hexaboride is within the scope of the present invention.

From the foregoing, it will be understood that improved metal matrix composites of aluminum, magnesium and titanium are achieved by the addition of calcium hexaboride particles. The composition can be easily prepared with a minimum of stirring, and the product can be recycled if desired.

In another embodiment of the presently disclosed invention, a metal matrix material is made by combining solid metal particles with solid ceramic particles. The metal and ceramic particles are both in a dry powdered form and are mixed together in proportions according to the particular properties that are selected for the metal matrix composite. The metal and ceramic particle mixture is then compressed according to powdered metal processes for making metal matrix composites as are generally known in the art and described, for example, in U.S. Pat. Nos. 5,486,223, and 5,895,696.

In the embodiment of the presently disclosed invention, the ceramic material is prepared in powdered form such as in a jet mill. The powdered ceramic material of silicon hexaboride, calcium hexaboride; silicon tetraboride, calcium tetraboride, or combinations thereof is then blended with powdered metal of aluminum, magnesium, titanium, or combinations thereof to form a substantially uniform mixture of the ceramic/metal materials. In the preferred embodiment of the presently disclosed invention, the metal is in the range of about 1% to 50% by weight and the ceramic material is in the range of about 50% to 99% by weight.

As known to those skilled in the art, the ceramic/metal mixture is then placed in a mould and compressed under high pressure. As known to those skilled in the art of powdered metal technology, the mold is in the shape of the desired product so that a metal matrix composite product is formed. Conventional metal processing is then performed on the molded shape as required to produce the finished product.

It has been found that metal matrix composite material according to the powdered metal process has a modulus of elasticity in the range of about 140 to 170 GPa, density in the range of about 2.6 to 2.9 grams/c$^3$, specific Modulus of about 50 to 70 GPa/g/c$^3$, and a coefficient of thermal expansion in the range of about 8.0 to 12 ppm/° K.

As a more specific example shown in the FIGURE, in accordance with the disclosed invention, a metal matrix composite disk 10 such as the type that is suitable for use as a substrate for making computer memory storage disks is made by blending powdered aluminum metal with powdered silicon hexaboride. The aluminum/silicon hexaboride mixture is then placed in a mold that is in the general shape of the disk and pressed to form a metal matrix composite disk blank. Conventional metal shaping and finishing processes such as grinding and polishing are then preformed on the blank to produce a finished disk.

Also in accordance with the invention disclosed herein, a layer of amorphous material 12 is added to the sides 14 and 16 of the metal matrix composite disk to form a metal matrix composite disk substrate. Preferably, layer of amorphous material 12 is a layer of nickel-phosphorous that covers the aluminum/silicon hexaboride matrix composite disk 10 to form the metal matrix composite disk substrate. The nickel-phosphorous layer 12 is added to the disk by electroless plating techniques as generally known to those skilled in the art such as described in U.S. Pat. No. 5,895,696. Thereafter, a magnetic memory overlay layer 18 is added to the disk substrate to produce the memory disk. The magnetic memory overlay layer 18 is generally applied by vacuum sputtering deposition techniques that are also known to those skilled in the art.

While there has been shown and described what is at present considered the preferred embodiments of the invention, it will be obvious to those skilled in the art that various changes and modifications may be made therein without departing from the scope of the invention as defined by the appended claims.

I claim:

1. A metal matrix composite comprising a magnesium matrix and particles of calcium hexaboride, said particles of calcium hexaboride being present in a range of about 0.1 to about 80 wt. % in the metal.

2. A metal matrix composite in accordance with claim 1 wherein said calcium hexaboride has an average particle size of about 0.1 to about 200 microns.

3. A metal matrix composite comprising a metal selected from the group consisting of aluminum, magnesium, titanium and mixtures thereof, and particles of calcium hexaboride and particles of silicon hexaboride, said particles of calcium hexaboride and said particles of silicon hexaboride being present in a range of about 0.1 to about 80 wt. % in the metal.

4. A metal matrix composite in accordance with claim 3 wherein said particles of calcium hexaboride and said particles of silicon hexaboride have an average particle size of about 0.1 to about 200 microns.

5. A metal matrix composite in accordance with claim 3 wherein said metal is aluminum.

6. An article of manufacture comprising a metal matrix composite, said metal matrix composite comprises a magnesium matrix and particles of calcium hexaboride, said particles of calcium hexaboride being present in a range of about 0.1 to about 80 wt. % in the metal.

7. An article of manufacture in accordance with claim 6 wherein said calcium hexaboride has an average particle size of about 0.1 to about 200 microns.

8. A horseshoe made of a metal matrix composite and having an elastic modulus in the range of 70–180 GPa., said horseshoe comprising a metal matrix composite having a magnesium matrix and particles of calcium hexaboride, said particles of calcium hexaboride being present in a range of about 0.1 to about 80 wt. % in the metal.

9. The horseshoe of claim 8 wherein said metal matrix composite contains from about 5 to about 10 wt % calcium hexaboride particles having an average particle size of about 75 microns.

10. A memory disk substrate made of a metal matrix composite and having an elastic modulus in the range of 70–180 GPa., said memory disk comprising a metal matrix composite having a magnesium matrix and particles of calcium hexaboride, said particles of calcium hexaboride being present in a range of about 0.1 to about 80 wt. % in the metal.

11. The memory disk of claim 10 wherein said memory disk substrate is made from a metal matrix composite that contains calcium hexaboride particles having an average particle size of about 10 microns and the remainder being metal.

12. An actuator arm for a hard drive, said actuator arm being made of a metal matrix composite and having an elastic modulus in the range of 70–180 GPa., said actuator arm comprising a metal matrix composite having a magnesium matrix and particles of calcium hexaboride, said particles of calcium hexaboride being present in a range of about 0.1 to about 80 wt. % in the metal.

13. An actuator arm in accordance with claim 12 wherein said metal matrix composite contains about 30 wt % calcium hexaboride particles having an average particle size of about 50 microns.

* * * * *